Patented Nov. 12, 1929

1,735,022

UNITED STATES PATENT OFFICE

JOSEPH B. STRAUSS, OF CHICAGO, ILLINOIS

CAR-DUMPING DEVICE

Application filed April 4, 1921. Serial No. 458,517.

This invention relates to car dumping devices and has for its object to provide a new and improved device of this description by means of which a car can be easily and quickly moved to an unloading position so that the material therein may be easily and quickly unloaded The invention has further objects which are more particularly set out in the following description.

Referring now to the accompanying drawings

Like numerals refer to like parts throughout the several figures.

Figure 1:
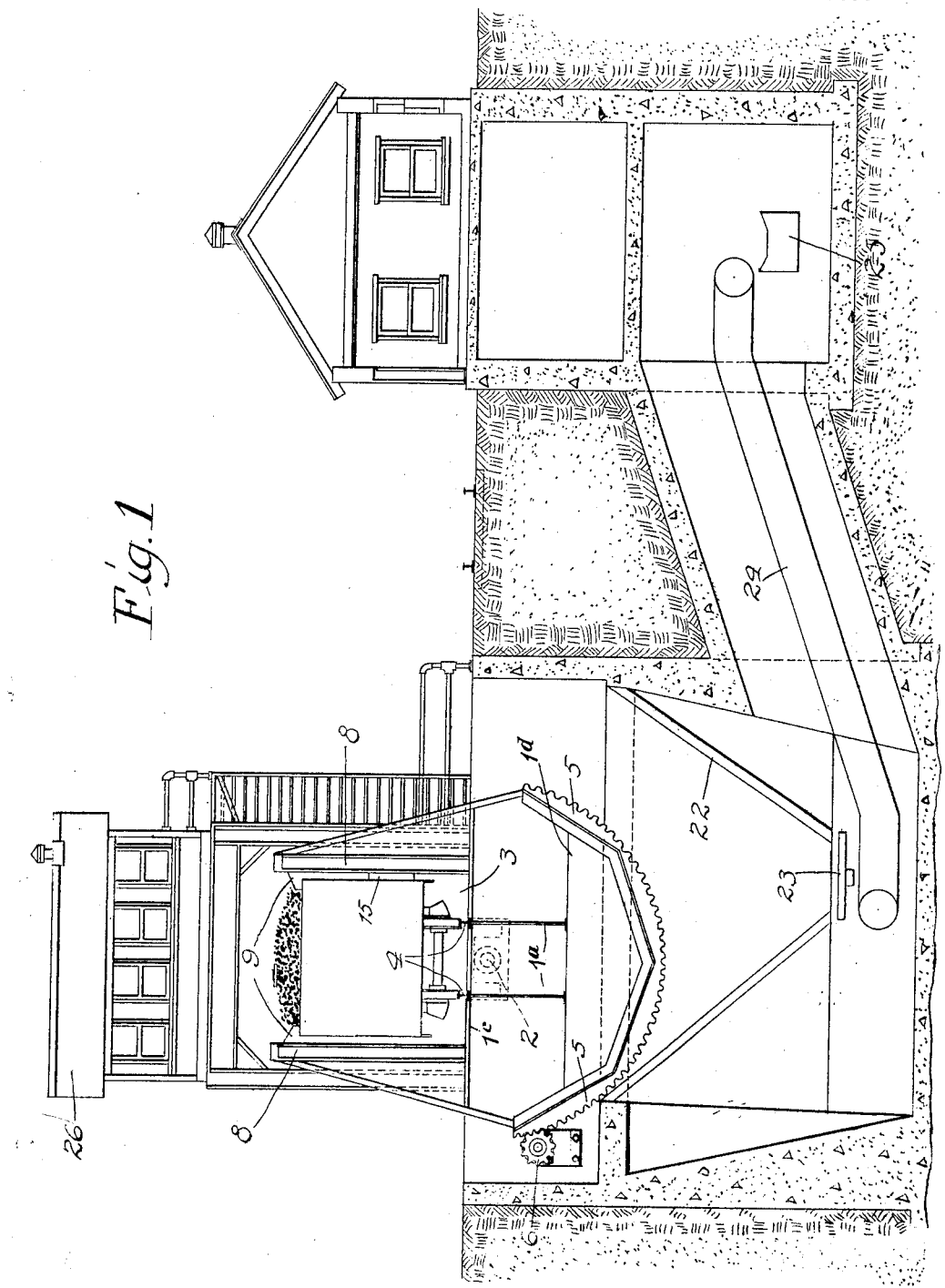
Fig. 1 is a view showing one form of device embodying the invention.

In carrying out the invention I provide a moving frame mounted upon trunnions 2 located near the middle thereof. At one side of the trunnions I provide a compartment 3 for the car to be dumped, there being rails 4 upon which said car rests. The moving frame is rotated upon its trunnions by some suitable mechanism. As herein shown it is provided with racks 5. A pinion 6 engages these racks. The compartment 3 is provided with side members 8. Associated with these side members are the top clamps 9. These top clamps are actuated in any desired manner. As herein shown the motor 10 is connected with a shaft 11 which has the equalizing gears 12. This shaft by means of beveled gears 13 drives the screw threaded shafts 14 which are connected with the clamps, the arrangement being such that when the shafts 14 are rotated in one direction the clamps are moved down to engage the top of the car, and when rotated in the other direction the clamps are moved to release the top of the car. There are also side clamps 15. These are operated by means of the motors 16 which drive the shafts 17 having the equalizing gears 18. These shafts by means of beveled gears 19 drive the screw threaded shafts 20 to which are attached the side clamps 15, the arrangement being such that when the screw threaded shafts are moved in one direction the clamps are moved to engage the side of the car, and when moved in the other direction the clamps are moved to release the car. Below the moving frame is a hopper 22 into which the material of the car is dumped. At the bottom of this hopper is a feeder which is shown as an endless conveyor, and below the feeder is a conveyor 24 which conveys the material to a conveyor 25 which conveys the material to the point desired. There is a dumper control operating house 26 for the operator who controls the mechanism of the dumper.

Figure 2:
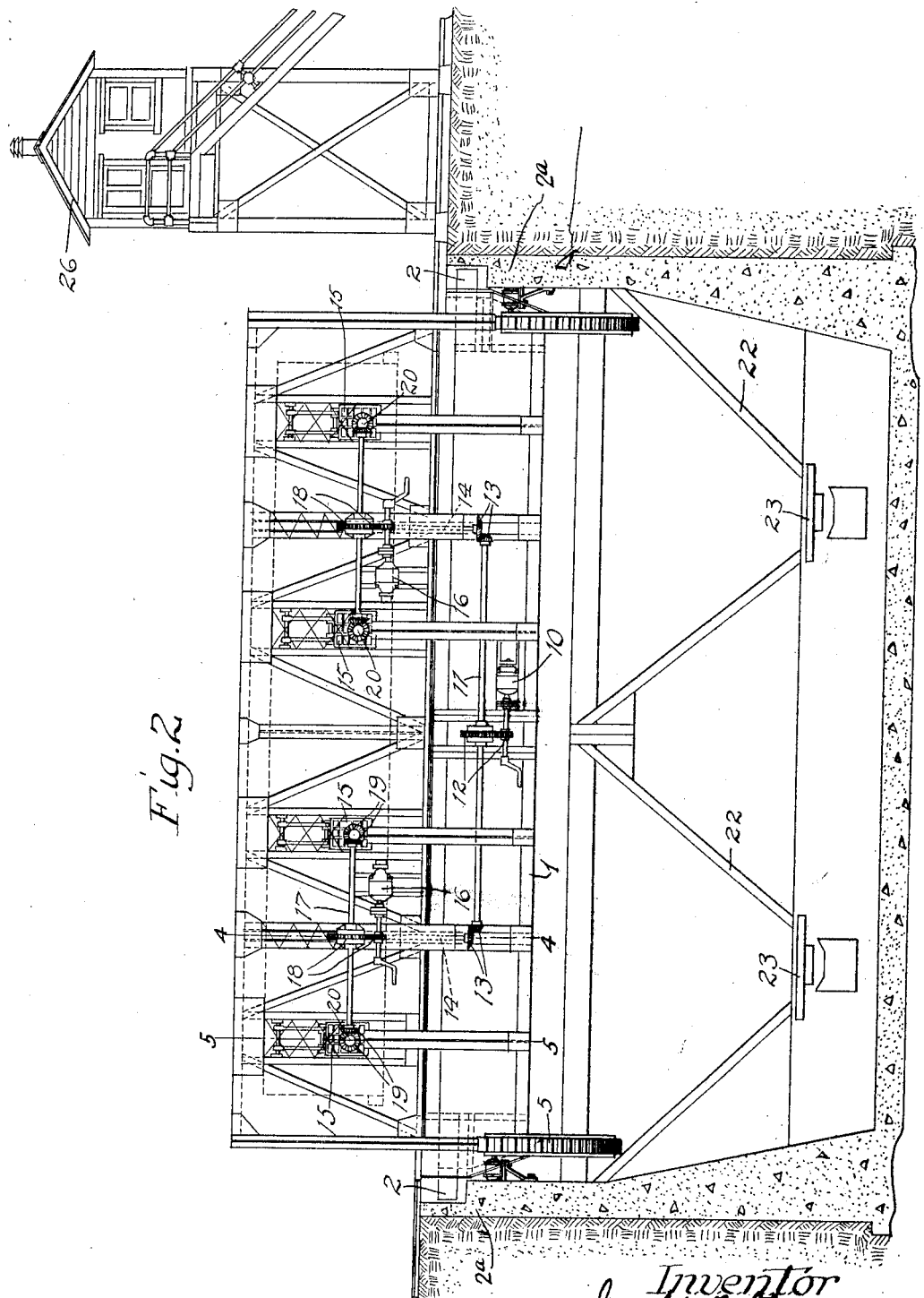
Fig. 2 is a side elevation of the device shown in Fig. 1.
Figure 3:
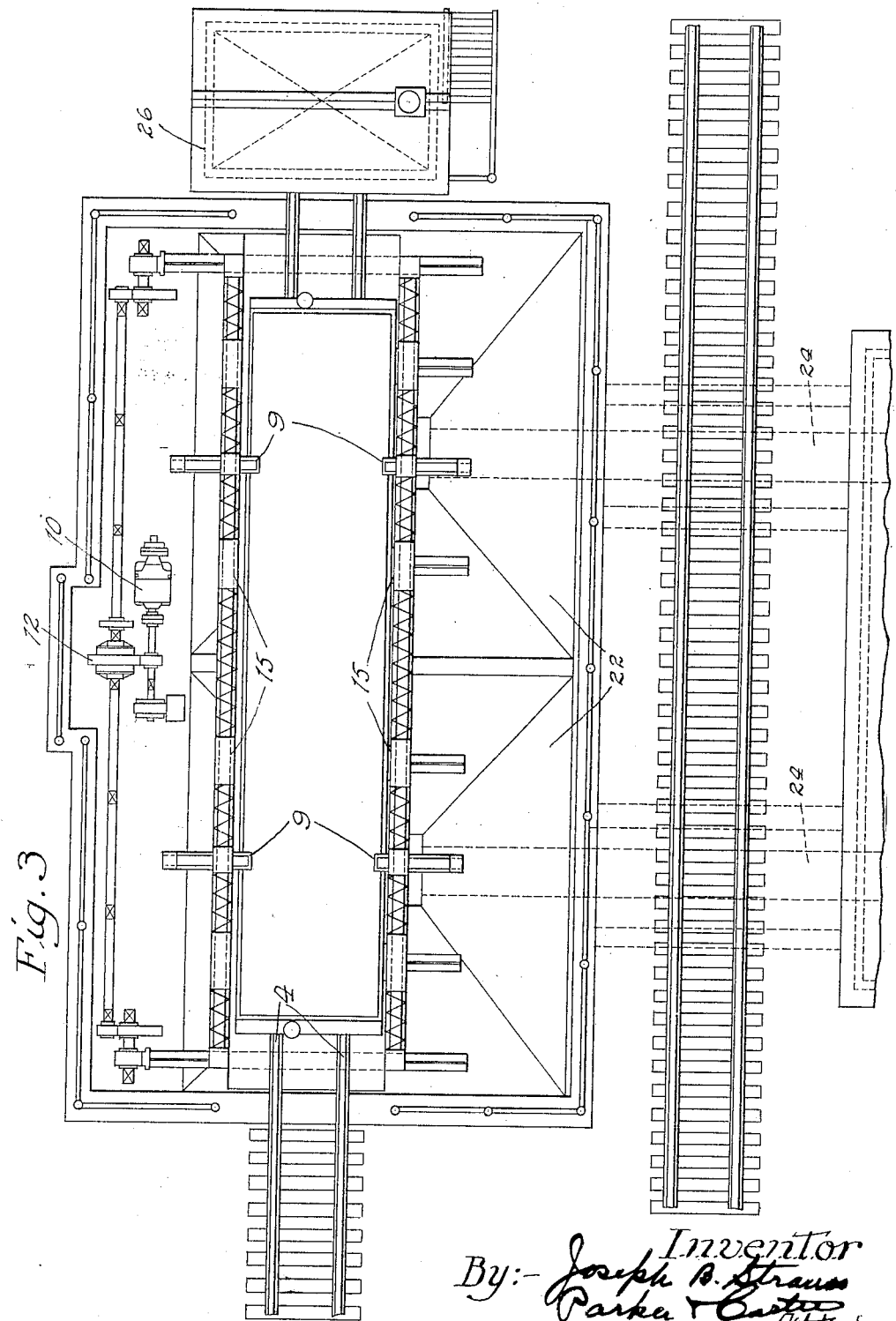
Fig. 3 is a plan view of the device shown in Fig. 1.
Figure 4:
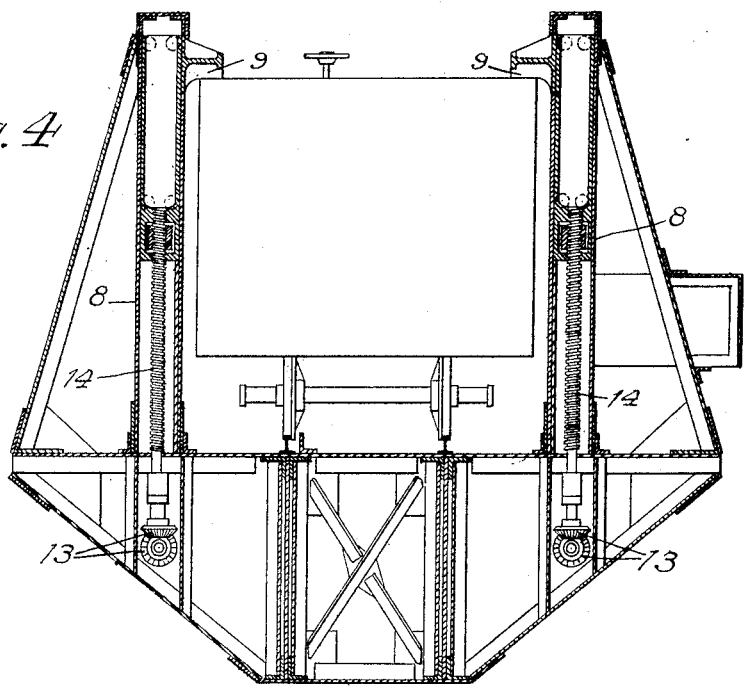
Fig. 4 is a sectional view taken on line 4—4 of Fig. 2 showing the arrangement of the clamps for the top of the car.
Figure 5:
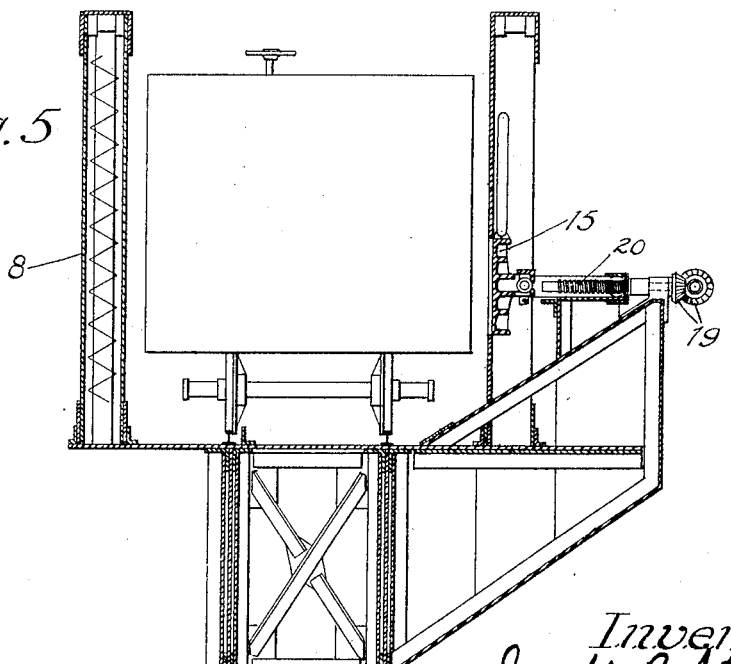
Fig. 5 is a sectional view taken on line 5—5 of Fig. 2 showing the arrangement of the clamps for the side of the car.

In this construction there are two fixed end frames $2^a$ and an intermediate moving frame 1, the moving frame 1 comprising two longitudinal girders $1^a$ connected to transverse girders $1^b$ at their ends, the railway floor $1^c$ for the car being carried by the longitudinal girders, the car being carried on this floor, there being cantilever trunnions 2 connected with the moving frame, and fixed frames below the level of the railway floor (see Fig. 2), the counterweight $1^d$ being on one side of the trunnions, and the car floor on the other side.

The operation of the device is as follows: The car is run in on the track in the compartment 3 and is then clamped by the top and side clamps so as to be held in position. The compartment is then rotated by a motor rotating the pinion engaging the rack 5 until the car is turned over. The material is then dumped into the hopper 22, and the empty car is brought back to its initial position. The clamps are then released and the car moved out of compartment 3 and another car moved in. The operation above described being repeated.

I claim:

1. A car dumper comprising two fixed end frames, a movable frame intermediate the end frames, said movable frame comprising two longitudinal girders connected to transverse girders at their ends, a railway floor carried by said longitudinal girders and projecting laterally on each side of said girders, side members projecting upwardly from said laterally projecting portions of said floor, said floor adapted to carry a car, cantilevered trunnions below the level of the railway floor associated with said movable frame and fixed frames, and operating mechanism for rotating the movable frame to dump the car, screw threaded shafts located in the interior of said upwardly projecting side members, sliding members in said side members operatively connected with said screw threaded shafts and clamps connected with said sliding members, screws for controlling the clamping device, said screws located in the side members so as to be covered and protected thereby.

2. A car dumper comprising two fixed end frames, a movable frame intermediate the end frames, said movable frame comprising two longitudinal girders connected to transverse girders at their ends, a railway floor carried by said longitudinal girders and projecting laterally on each side of said girders, side members projecting upwardly from said laterally projecting portions of said floor, said floor adapted to carry a car, cantilevered trunnions below the level of the railway floor associated with said movable frame and fixed frames, a counterweight on the opposite side of the trunnions, and operating mechanism for rotating the movable frame to dump the car, screw threaded shafts located in the interior of said upwardly projecting side members, sliding members in said side members operatively connected with said screw threaded shafts and clamps connected with said sliding members, screws for controlling the clamping device, said screws located in the side members so as to be covered and protected thereby.

Signed at Chicago, county of Cook and State of Illinois, this 23rd day of March, 1921.

JOSEPH B. STRAUSS.